United States Patent [19]

Minegishi

[11] Patent Number: 4,770,062

[45] Date of Patent: Sep. 13, 1988

[54] PLANETARY GEAR APPARATUS

[75] Inventor: Kiyoji Minegishi, Aichi, Japan

[73] Assignee: Sumitomo Heavy Industries Ltd., Tokyo, Japan

[21] Appl. No.: 83,901

[22] Filed: Aug. 6, 1987

Related U.S. Application Data

[63] Continuation of Ser. No. 831,213, Feb. 20, 1986, abandoned.

[51] Int. Cl.⁴ .............................................. F16H 1/32
[52] U.S. Cl. ..................................................... 74/804
[58] Field of Search ........................... 74/804, 797, 801

[56] References Cited

U.S. PATENT DOCUMENTS

| 3,073,184 | 1/1963 | Braren | 74/804 |
| 3,144,791 | 8/1964 | Menge, Sr. | 74/804 |
| 3,146,638 | 9/1964 | Peras | 74/804 X |
| 3,252,356 | 5/1966 | Lafferty | 74/799 |
| 4,050,331 | 9/1977 | Braren | 74/804 |
| 4,297,920 | 11/1981 | Richter | 74/804 |
| 4,429,595 | 2/1984 | Butterfield | 74/804 |
| 4,567,790 | 2/1986 | Butterfield et al. | 74/804 |

FOREIGN PATENT DOCUMENTS

| 2358827 | 2/1975 | Fed. Rep. of Germany . | |
| 224764 | 5/1975 | France . | |
| 1535643 | 7/1978 | France . | |
| 2381215 | 9/1978 | France . | |
| 113340 | 6/1984 | Japan | 74/804 |
| 117940 | 7/1984 | Japan | 74/804 |
| 60-146939 | 2/1985 | Japan . | |
| 61-38242 | 2/1986 | Japan . | |
| 587607 | 4/1947 | United Kingdom | 74/804 |

Primary Examiner—Leslie A. Braun
Assistant Examiner—Dwight G. Diehl
Attorney, Agent, or Firm—Armstrong, Nikaido, Marmelstein & Kubovcik

[57] ABSTRACT

A planetary gear apparatus has an external gear mounted on an input shaft through an eccentric member, and an internal gear which engages with the external gear and is concentric with respect to an output shaft. A recess is provided in the output shaft, and internal or external splines are provided on either the inner or outer side of the recess so as to be concentric with respect to the output shaft. The external gear has either a carrier or an annular groove provided on the side thereof which is closer to the output shaft. The carrier or the annular groove is provided with internal or external splines so as to be concentric with respect to the external gear. The internal or external splines on the output shaft and the internal or external splines on the external gear are operatively connected together by a drive having external or internal splines provided at both ends thereof. The drive is constituted by a hollow shaft having a through-hole. The input shaft is received through the through-hole in the drive and is rotatably born within the recess of the output shaft.

5 Claims, 6 Drawing Sheets

PLANETARY GEAR APPARATUS

This application is a continuation of application Ser. No. 831,213 filed Feb. 20, 1986, abandoned.

BACKGROUND OF THE INVENTION

1. Field of the Invention

The present invention relates to an improvement in a planetary gear apparatus having an internal gear provided with inner teeth which are constituted by pins or a combination of pins and rollers, and an external gear provided with outer teeth having, for example, a trochoidal tooth form. More particularly, the present invention pertains to an improvement in a planetary gear apparatus having a joint which is constituted by a universal joint.

2. Description of the Related Art

A typical conventional planetary gear reducer will first be described hereinunder, with reference to FIGS. 5 and 6.

The illustrated known planetary gear reducer is arranged so that a rotational force imparted from an input shaft 1 is transmitted to an output shaft 2 after its rotational speed has been reduced.

The mechanism for reducing the speed is as described below.

Eccentric members $3_1$ and $3_2$ are provided on the input shaft 1 at a predetermined phase difference (180° in this example). The eccentric members $3_1$ and $3_2$ are in contact with external gears $5_1$ and $5_2$, respectively, through rollers 4. Each of the external gears $5_1$ and $5_2$ is provided with a plurality of inner roller bores 6. An inner pin 7 and an inner roller 8 are fitted into each of the bores 6. The outer periphery of each of the external gears $5_1$ and $5_2$ is provided with outer teeth 9 having, for example, a trochoidal or circular form. The outer teeth 9 engage with outer pins 11 provided on an internal gear 10.

The inner pins 7 are shrink fitted into a flange 12 of the output shaft 2.

In this known art, when the input shaft 1 rotates one revolution, the eccentric members $3_1$ and $3_2$ also rotate one revolution, but the external gears $5_1$ and $5_2$ are prevented from self rotating because of the engagement between the inner roller bores 6 and the inner pins 7. Therefore, if the difference between the number of teeth on the external gears $5_1$ and $5_2$ and the number of outer pins 11 (acting as inner teeth) is one, when the input shaft 1 rotates one revolution, the external gears $5_1$ and $5_2$ move relative to the internal gear 10 only by an amount corresponding to one outer tooth 9. In consequence, one revolution of the input shaft 1 is reduced to an amount through which the external gears $5_1$ and $5_2$ turn, which corresponds to the reciprocal of the number of teeth on the gears $5_1$ and $5_2$, and the rotational force whose speed is thus reduced is then transmitted to the output shaft 2 through the inner pins 7.

The planetary gear mechanism of the type described above, however, retains the following disadvantages.

The power transmission mechanism which is constituted by the inner roller bores 6, the inner pins 7 and the inner rollers 8 applies a radial force to the output shaft 2. It is therefore necessary to provide a flange 12 which is rigid enough to prevent the output shaft 2 from being deformed by the application of that force. For this reason, the size of members or portions near the output shaft 2 cannot be reduced in the diametrical direction of the shaft 2. In addition, the power transmission mechanism requires highly-accurate machining and must also have a suitably high rigidity, since any slight deformation of a member or portion thereof has an adverse effect on the operation.

In addition, the inner roller bores 6 occupy a relatively large space in the external gears $5_1$ and $5_2$, and therefore hinder any reduction in size of the external gears $5_1$ and $5_2$, which impedes any reduction in the size of the apparatus as a whole.

Another type of known mechanism (see the specification of Japanese Patent Application Laid-Open No. 146,939/85) is arranged so that a carrier is mounted on an external gear and is connected to an output shaft by an intermediate drive gear, whereby radial load is prevented from acting on the output shaft. In this apparatus, however, the input shaft is supported in a cantilever fashion, and this means that the bearing of the shaft must withstand a relatively large load, so that it is not possible to reduce the size of the casing housing the elements on the input-shaft side.

SUMMARY OF THE INVENTION

In view of the above-described disadvantages of the prior art, it is a primary object of the present invention to provide an improved planetary gear apparatus that has a simple mechanism which enables the input-shaft side of the apparatus to have a simplified structure and a reduced size, the apparatus further having a reduced axial length and an output-shaft side which also has a simplified structure and reduced size.

To this end, the present invention provides a planetary gear apparatus having an external gear mounted on an input shaft through an eccentric member, and an internal gear which engages with the external gear and is concentric with respect to the output shaft, in which a recess is provided in the output shaft, and inner or outer splines are provided on either the inner or outer side of the recess so as to be concentric with respect to the output shaft. The external gear has either a carrier or an annular groove provided on the side thereof which is closer to the output shaft. The carrier or the annular groove is provided with inner or outer splines so as to be concentric with respect to the external gear. The inner or outer splines on the output shaft and the inner or outer splines on the external gear are operatively connected together by a drive which has outer or inner splines provided at both ends thereof. The drive is constituted by a hollow shaft having a through-hole. In addition, the input shaft is received through the through-hole in the drive and is rotatably born within the recess of the output shaft.

The above and other objects, features and advantages of the present invention will become more apparent from the following description of the preferred embodiments thereof, taken in conjunction with the accompanying drawings.

DESCRIPTION OF THE PREFERRED EMBODIMENTS

The present invention will be described hereinunder in detail with reference to the accompanying drawings.

Figure 1:
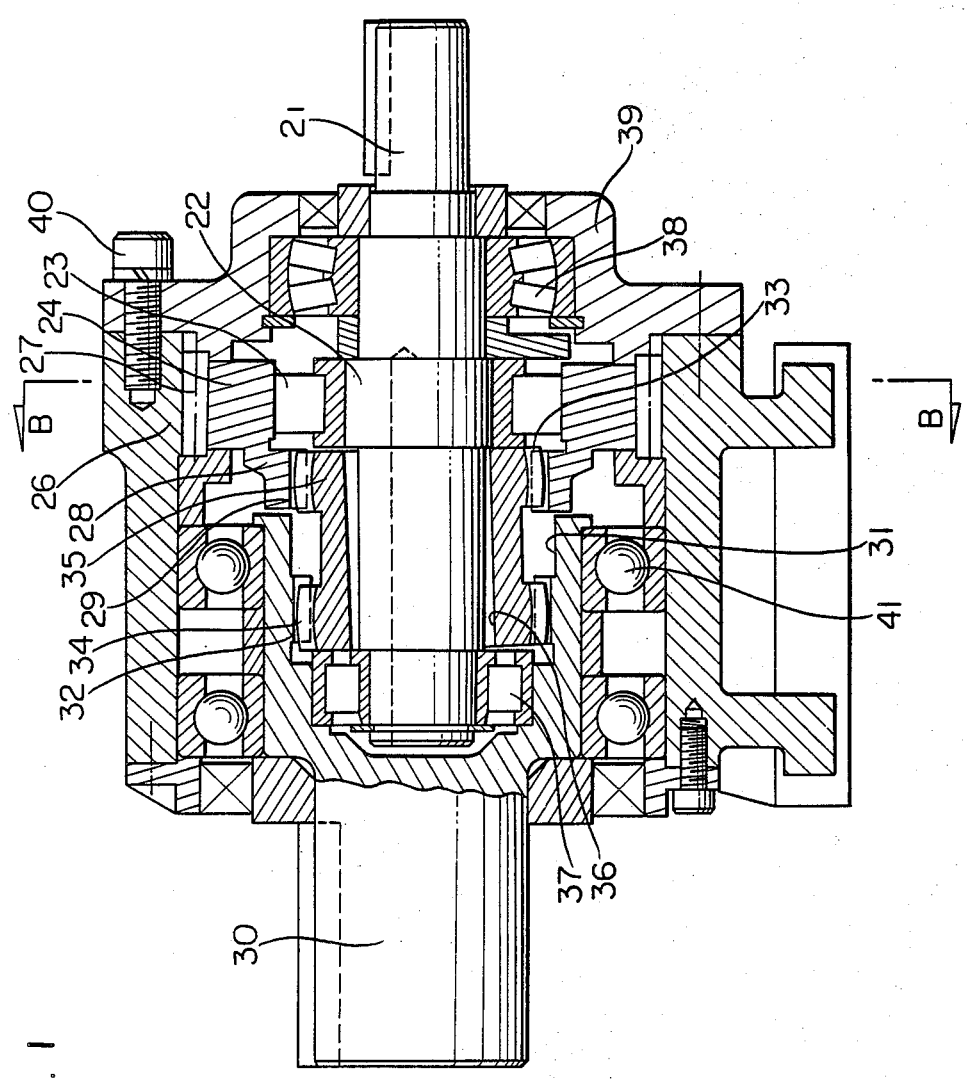
FIG. 1 is a sectional view of one embodiment of the present invention.
Figure 2:
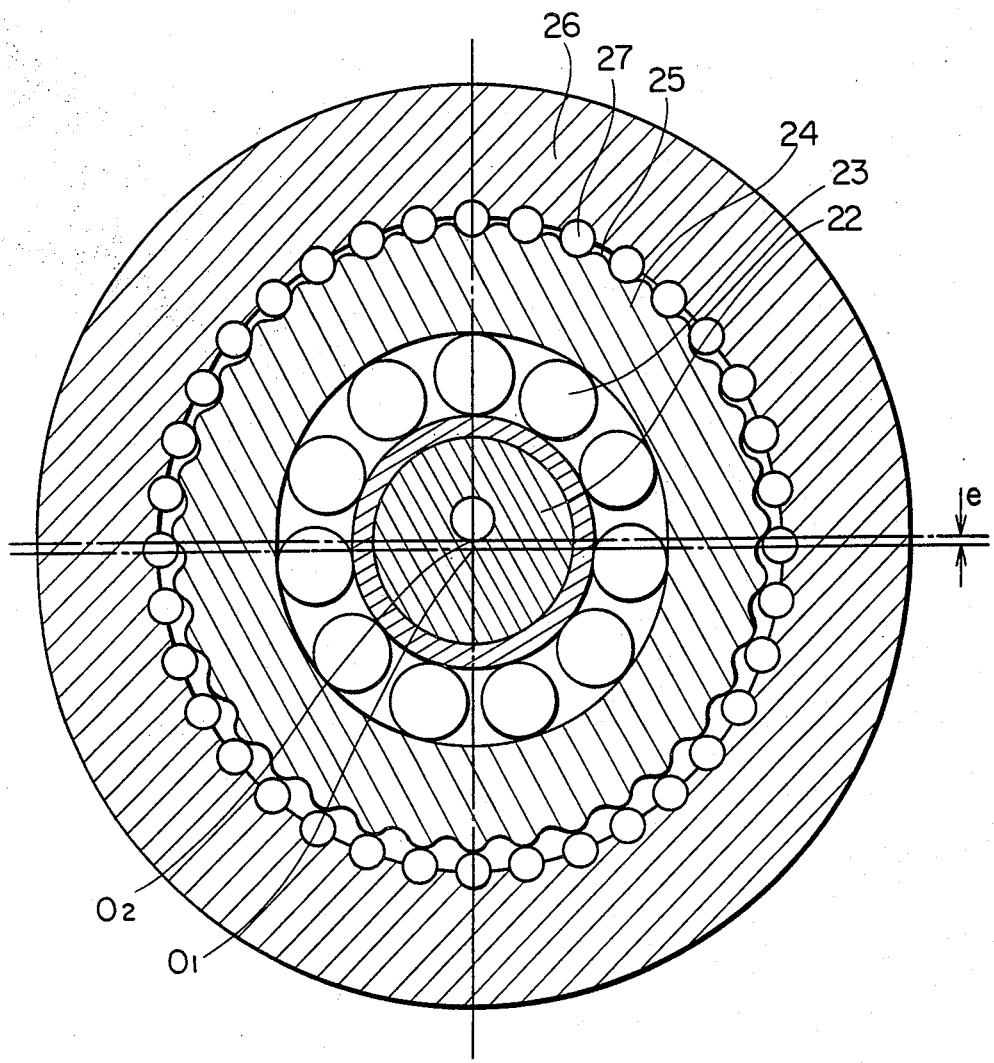
FIG. 2 a sectional view taken along the line B—B of FIG. 1.

Referring first to FIGS. 1 and 2 which show in combination one embodiment of the present invention, an input shaft 21 is formed with an eccentric member 22 having an eccentricity e. An external gear 24 is fitted on the eccentric member 22 through a bearing 23. Accordingly, the external gear 24 is disposed in such a manner that the axis $0_2$ of the external gear 24 is eccentric with respect to the axis $0_1$ of the input shaft 21 (and also an internal gear 26) by the eccentricity e. Outer teeth 25 of the external gear 24 have an appropriate tooth form such as a trochoidal or circular tooth form. The outer teeth 25 engage with inner teeth of the internal gear 26 which are constituted by outer pins 27. The external gear 24 has a carrier 28 integrally provided on the side thereof which is closer to an output shaft 30. The carrier 28 is provided with inner splines 29 which are concentric with respect to the external gear 24.

The output shaft 30 is provided with a recess 31. The inner side of the recess 31 is provided with inner splines 32 which are concentric with respect to the input shaft 21. A floating drive 35 which has outer splines 33 and 34 is supported between the inner splines 29 and 32.

The drive 35 is constituted by a hollow shaft having a through-hole 36 defined therein. The input shaft 21 is received through the through-hole 36 and is rotatably supported by a bearing 37 within the recess 31 of the output shaft 30. Accordingly, the input shaft 21 is supported at two portions on both sides of the external gear 24 by the bearing 37 and 38, respectively.

The internal gear 26 is tubular and integral with an output-shaft casing and is secured to an input-shaft casing 39 by bolts 40. The output shaft 30 is rotatably supported by the output-shaft casing integral with the internal gear 26 through bearings 41.

Figure 3:
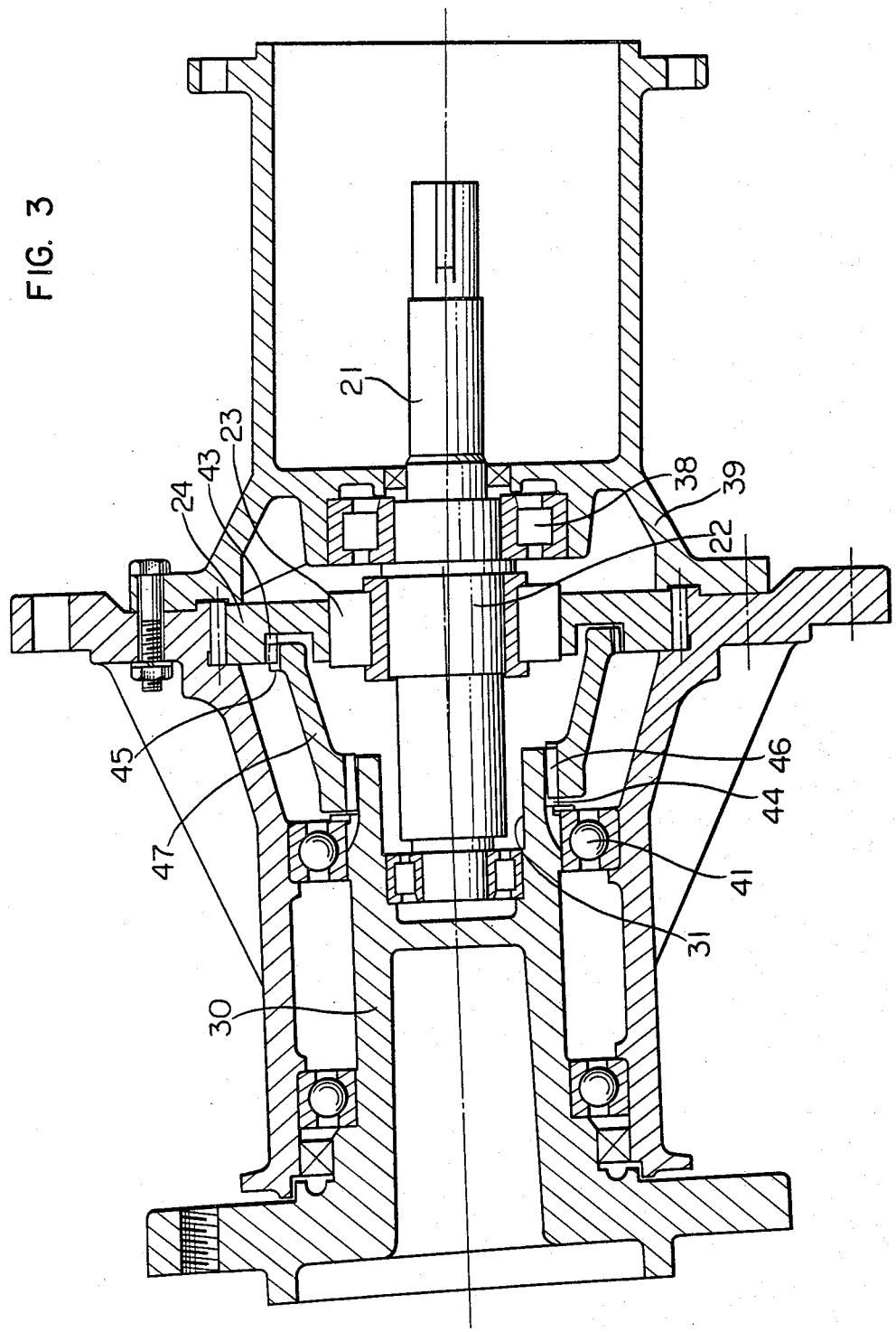
FIGS. 3 and 4 sectional views showing in combination another embodiment of the present invention.
Figure 4:
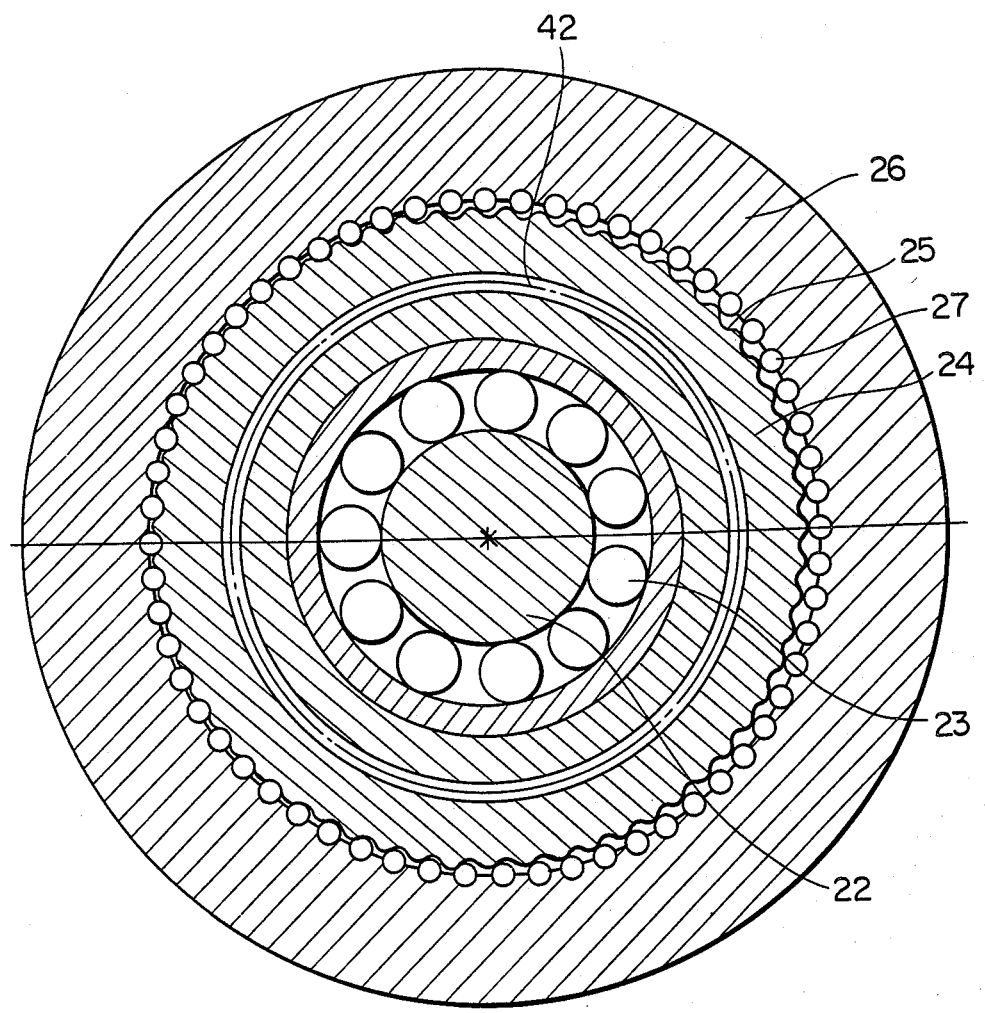
Figure 5:
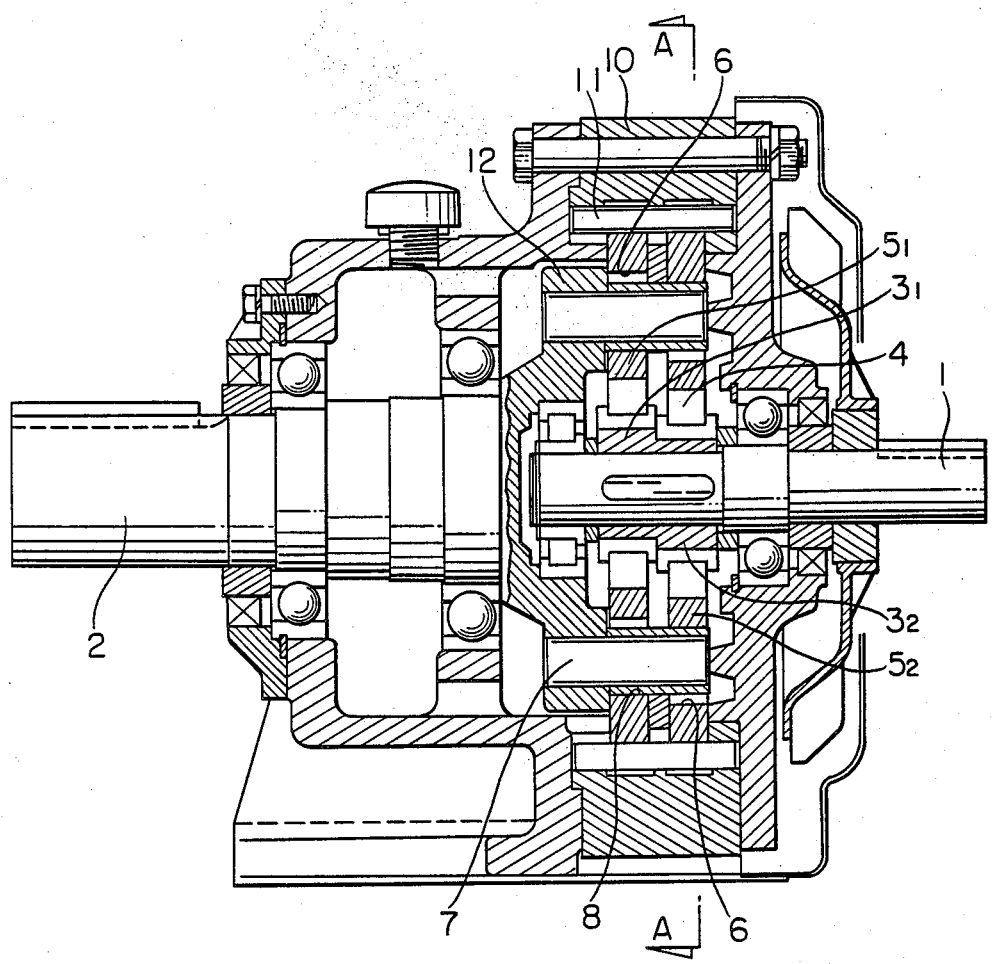
FIG. 5 is a sectional view of a one example of conventional apparatus.
Figure 6:
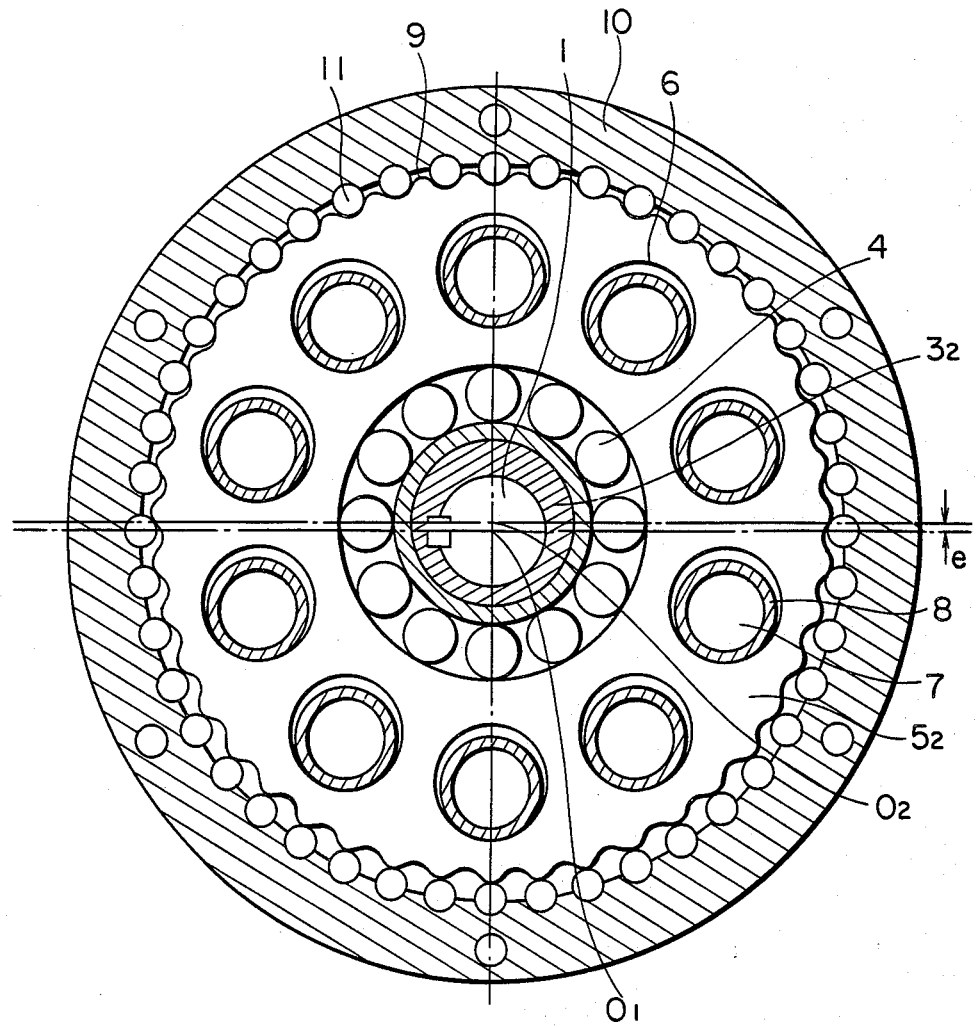
FIG. 6 is a sectional view taken along the line A—A of FIG. 5.

Another embodiment of the present invention is shown in FIGS. 3 and 4. Since this embodiment is basically the same as the first embodiment shown in FIGS. 1 and 2, the same constituent elements or portions of this embodiment as those of the first embodiment are denoted by the same reference numerals, and description will be made with respect to only differencies between these embodiments.

In this embodiment, in place of the carrier 28, an annular groove 42 is provided on the side of the external gear 24 which is closer to the output shaft 30. The annular groove 42 is provided with inner splines 43 which are concentric with respect to the external gear 24. On the other hand, the output shaft 30 is provided with a recess 31 which is provided on the outer side thereof with outer splines 44 which are concentric with respect to the input shaft 21. In addition, a floating drive 47 which has outer and inner splines 45 and 46 is floating between the inner and outer splines 43 and 44.

The following is a description of the operation of the planetary gear apparatus according to the present invention, arranged as described above.

As the input shaft 21 rotates, the eccentric member 22 also rotates, so that a rotational force imparted from the input shaft 21 is transmitted to the external gear 24 through the bearing 23. Since the axis $0_1$ of the input shaft 21 and the axis $0_2$ of rotation of the external gear 24 are eccentric with respect to each other by the eccentricity e and the external gear 24 is operatively connected to the floating drive 35 or 47 through either the carrier 28 or the annular groove 42, the revolution of the external gear 24 around the axis $0_1$ of the input shaft 21 is absorbed by the oscillation of the drive 35 or 47, and the rotational force from the input shaft 21 alone is taken out after its rotational speed has been reduced to the reciprocal of number of outer teeth 25 because of the engagement between the external gear 24 and the outer pins 27. The rotational motion of the external gear 24 is transmitted to the drive 35 or 47 through the carrier 28 or the annular groove 42 and is further transmitted to the output shaft 30.

The load which acts on the input shaft 21 is applied thereto through the external gear 24. However, since the input shaft 21 is supported at two portions on both sides of the external gear 24 by the bearings 37 and 38, respectively, a correspondingly reduced load is applied to each of the bearings 37 and 38, and this means that it is possible to reduce the size of the bearings 37 and 38.

Although the present invention has been described above with respect to a gear reducer, it is to be noted here that the invention may also be applied to a speed increaser.

The present invention, which is arranged and operates as described above, offers the following various advantages.

Since the input shaft is supported at two portions on both sides of the external gear, it is possible to reduce the size of the bearings which rotatably support the input shaft, so that each of the input shaft and the input-shaft casing is allowed to have a reduced size and a simplified structure.

The drive which is constituted by a hollow shaft enables a reduction in weight of the apparatus as a whole.

Since the drive is supported in such a manner that it floats with respect to the carrier or the annular groove of the external gear and the output shaft, any possible machining error can be absorbed, so that there is no need for a specially high degree of accuracy in machining.

The present invention needs no inner roller bores. Therefore, the diameter in the radial direction of the external gear can be minimized, so that it is possible to obtain a reduction gear apparatus with a reduced size.

Since torque alone is transmitted to the output shaft and no radial load acts thereon, it is possible to reduce any angular back-lash which may be generated as a result of deformation of the output shaft.

The internal gear which is tubular and integral with the output-shaft casing enables the output-side of the apparatus to have a reduced size and a simplified structure and permits transmission of large torque, since there is no connection by means of a bolt.

What is claimed is:

1. In a planetary gear apparatus having: an input shaft; an eccentric member mounted on said input shaft so as to be eccentric with respect to said input shaft; a stationary internal gear concentrically surrounding said input shaft; an external gear carried by said eccentric member and engaging with said internal gear, said external gear rotating around its own axis while revolving around the axis of said input shaft in response to the rotation of said input shaft; an output shaft extending coaxially with respect to said input shaft; and a driving member which connects together said external gear and said output shaft to transmit the rotational motion of said external gear to said output shaft, an improvement comprising: said output shaft being provided at one end thereof with a recess which surrounds the distal end portion of said input shaft; said driving member being constituted by a hollow shaft having a through-hole through which said input shaft extends, said hollow shaft having both end portions thereof operatively connected to said external gear and said output shaft through splines, respectively; and said input shaft having its distal end portion rotatably born within the recess in said output shaft.

2. In a planetary gear apparatus having an external gear mounted on an input shaft through an eccentric member, and a stationary internal gear which engages with said external gear and is concentric with respect to an output shaft, an improvement comprising: a recess provided in said output shaft; a carrier provided on said external gear; a drive member spline connected at one end thereof to said output shaft and spline-connected at the other end thereof to said carrier, said drive member being constituted by a hollow shaft having a through-hole, said input shaft being received through the through-hole of said drive member and rotatably born within the recess of said output shaft.

3. The improvement of claim 2, wherein internal splines are provided on an inner surface of a first portion of said recess of said output shaft concentric with said output shaft and said input shaft is rotatably born in a second portion of said recess axially spaced from said first portion, further internal splines are provided on said carrier concentric with respect to said external gear, and said drive member is provided with external splines at both ends thereof meshing together with said internal splines of said output shaft and said further internal splines of said carrier.

4. In a planetary gear apparatus having an external gear mounted on an input shaft through an eccentric member, and a stationary internal gear which engages with said external gear and is concentric with respect to an output shaft, an improvement comprising: a recess provided in said output shaft; an annular groove provided on the side of said external gear which is closer to said output shaft; a drive member spline-connected at one end thereof to said output shaft and spline-connected at the other end thereof to said annular groove, said drive member being constituted by a hollow shaft, said input shaft being received through the hollow portion of said drive member and rotatably born within the recess of said output shaft.

5. The improvement of claim 4, wherein external splines are provided on an external surface of said output shaft concentric with said output shaft, internal splines are provided on a surface of said annular groove of said external gear concentric with an axis of said external gear, and said drive member is aprovided with internal splines at one end thereof meshing with said external splines of said output shaft and external splines at the other end thereof meshing with said internal splines of said external gear.

* * * * *